United States Patent
Pathak et al.

(10) Patent No.: US 12,481,873 B1
(45) Date of Patent: Nov. 25, 2025

(54) METHOD AND SYSTEM FOR GENERATIVE DESIGN BASED ON DEEP LEARNING AND TOPOLOGY OPTIMIZATION

(71) Applicant: ANSYS, INC., Canonsburg, PA (US)

(72) Inventors: Jay Pathak, Pleasanton, CA (US); Rishikesh Ranade, Bridgeville, PA (US)

(73) Assignee: ANSYS, INC., Canonsburg, PA (US)

( * ) Notice: Subject to any disclaimer, the term of this patent is extended or adjusted under 35 U.S.C. 154(b) by 1140 days.

(21) Appl. No.: 17/156,130

(22) Filed: Jan. 22, 2021

Related U.S. Application Data

(60) Provisional application No. 63/016,079, filed on Apr. 27, 2020.

(51) Int. Cl.
| | | |
|---|---|---|
| *G06F 7/48* | (2006.01) | |
| *G06F 18/2113* | (2023.01) | |
| *G06F 18/214* | (2023.01) | |
| *G06F 18/22* | (2023.01) | |
| *G06F 30/27* | (2020.01) | |
| *G06N 3/045* | (2023.01) | |
| *G06N 3/08* | (2023.01) | |

(52) U.S. Cl.
CPC ............ *G06N 3/08* (2013.01); *G06F 18/2113* (2023.01); *G06F 18/214* (2023.01); *G06F 18/22* (2023.01); *G06F 30/27* (2020.01); *G06N 3/045* (2023.01)

(58) Field of Classification Search
CPC ...... G06N 3/08; G06N 3/045; G06F 18/2113; G06F 18/214; G06F 18/22; G06F 30/27
See application file for complete search history.

(56) References Cited

U.S. PATENT DOCUMENTS

| | | | |
|---|---|---|---|
| 2019/0056715 A1* | 2/2019 | Subramaniyan | G06N 7/01 |
| 2019/0079491 A1* | 3/2019 | Barua | B29C 64/40 |
| 2020/0151286 A1* | 5/2020 | Willis | G06T 17/20 |
| 2020/0180228 A1* | 6/2020 | Satko | G06F 30/17 |

OTHER PUBLICATIONS

Bulat, Adrian, Jing Yang, and Georgios Tzimiropoulos. "To learn image super-resolution, use a gan to learn how to do image degradation first." Proceedings of the European conference on computer vision (ECCV). 2018. (Year: 2018).*

Guest, James K. "Topology optimization with multiple phase projection." Computer Methods in Applied Mechanics and Engineering 199.1-4 (2009): 123-135. (Year: 2009).*

(Continued)

*Primary Examiner* — Nithya J. Moll
(74) *Attorney, Agent, or Firm* — WOMBLE BOND DICKINSON (US) LLP

(57) ABSTRACT

A generative machine learning model, such as a convolutional neural network (CNN), can be trained with solutions from a topology optimization solver for a solution for a topology of a set of structures so that the generative machine learning model can generate a plurality of alternative designs for a structure that are alternative topology optimizations (for the structure) for a set of initial setup parameters. The generative model when being trained includes a generative network and a discriminator network. The generative model can be trained using outputs from a CNN autoencoder for densities and a CNN autoencoder for strain energies.

18 Claims, 9 Drawing Sheets

(56) References Cited

OTHER PUBLICATIONS

Li, Baotong, et al. "Non-iterative structural topology optimization using deep learning." Computer-Aided Design 115 (2019): 172-180. (Year: 2019).*
Lin, C-Y., and J-N. Chou. "A two-stage approach for structural topology optimization." Advances in Engineering Software 30.4 (1999): 261-271. (Year: 1999).*
Rosca, Mihaela, et al. "Variational approaches for auto-encoding generative adversarial networks." arXiv preprint arXiv:1706.04987 (2017). (Year: 2017).*
Tsirogiannis, Evangelos, and George-Christopher Vosniakos. "Redesign and topology optimization of an industrial robot link for additive manufacturing." Facta Universitatis, Series: Mechanical Engineering 17.3 (2019): 415-424. (Year: 2019).*
M.P. Bendsoe, "Optimal shape design as a material distribution problem", Structural Optimization 1, 193-202 (1989), 11 pages.
Ivan Sosnovik, Ivan Oseledets, "Neural networks for topology optimization", arXiv:1709.09578v1, [cs.LG] Sep. 27, 2017, 13 pages.
Zhenguo Nie, Haoliang Jiang, Tong Lin, Levent Burak Kara, "TopologyGAN: Topology Optimization Using Generative Adversarial Networks Based on Physical Fields Over the Initial Domain", Mar. 6, 2020, 19 pages.
Jiaqi Jiang and Jonathan A. Fan, "Global optimization of dielectric metasurfaces using a physics-driven neural network", arXiv:1906.04157v2 [cs.LG] Jul. 5, 2019, 20 pages.
Stephan Hoyer, Jascha Sohl-Dickstein, Sam Greydanus, Neural reparameterization improves structural optimization, arXiv:1909.04240v2 [cs.LG] Sep. 14, 2019, 6 pages.

* cited by examiner

SOLID BRACKET WITH HOLES

AN OPTIMIZED TOPOLOGY WITH
REDUCED MASS FOR BRACKET

METHOD AND SYSTEM FOR GENERATIVE DESIGN BASED ON DEEP LEARNING AND TOPOLOGY OPTIMIZATION

This application claims the benefit of and priority to U.S. provisional application No. 63/016,079 filed Apr. 27, 2020, which is incorporated herein by reference.

BACKGROUND

This disclosure relates to the field of machine assisted design of physical structures, and more particularly relates to the field of topology optimization of such physical structures.

Physical structures, such as a bracket, chassis, frame, etc., are often formed or fabricated from a single, solid block of material. For example, a bracket can be cut from a solid block of material, such as aluminum, to form the shape of the bracket. The bracket may then be finished by drilling one or more holes in the bracket, and these holes can be used to mount the bracket on another structure (such as a chassis, frame, wall, etc.). While a solid bracket can provide good mechanical support, it consumes a substantial amount of material that is often not needed, and it is possible to create alternative topologies that use less material which can reduce the cost of the structure.

For example, an alternative topology for the bracket can use a web like or mesh like form and shape while still providing adequate mechanical strength and support for the bracket. One process for creating such alternative topologies is referred to as topology optimization.

Topology optimization is a numerical technique to distribute the material inside a design region of the structure to have optimal properties (e.g., mechanical strength properties, etc.) and satisfy prescribed loads, design and manufacturing constraints. For example, this distribution can include removing the material from some regions of the structure, and this distribution can also include adding material to other regions of the structure. This distribution changes the spatial density of the material. Traditionally, topology optimization uses computer implemented solvers to perform a minimization of elastic strain energy (referred to as SIMP) of a part for a given total weight and boundary conditions that were specified as inputs to the solver. Examples of topology optimization include: [1] M. P. Bendsoe, Optimal shape design as a material distribution problem, Structural and multidisciplinary optimization 1 (4) (1989) 193 202; [2] Sosnovik, I., and Oseledets, I., 2017, "Neural Networks for Topology Optimization," ar Xiv Preprint arXiv: 1709.09578; and [3] Nie, Z., and Lin, T., 2020, Topology-GAN: Topology Optimization Using Generative Adversarial Networks Based on Physical Fields Over the Initial" ar Xiv Preprint arXiv: 2003.04685.

Topology optimization using a traditional SIMP method gives one optimal solution to a given problem setup and objective (such as the reduction of material mass by 20%). Thus, it is difficult to produce a variety of alternative designs because each alternative design requires invoking a solver to generate a new alternative topology design. This requires a user to input setup parameters to create each of the alternatives and requires the topology optimization system (e.g., solver) to compute the new topology based on those setup parameters. Thus, traditional approaches take a considerable amount of time to create alternative topologies, such as alternative topologies at different levels of material usage.

SUMMARY OF THE DESCRIPTION

This disclosure describes, among other things, methods for generative design using generative algorithms based on, for example, deep learning and topology optimization. The disclosed methods for generative design can apply generative ML (machine learning) models to generate a large number of solutions (or designs) and can rank them into a list of the top N designs (e.g., top 10 designs where N=10). The ML models can be conditioned with not only the output densities (e.g. material density such as p) produced by a topology optimization solver but also with internal results, such as evolving strain energies(S) or other physics constraints (such as volume fraction reduction), for a given problem (or design problem).

In one embodiment, a method can generate many solutions using topology optimizations with a large variety of geometric parts and shapes used and large variety of loads and boundary conditions. These solutions can be generated to allow extraction of intermediate results of the topology optimization. The intermediate results can include evolving densities (e.g., p), strain energies, or other applicable fields related to the solutions.

In another embodiment, a method can train a generative ML model (e.g. convolutional neural network autoencoders or generative adversarial networks (GAN) etc.) using the intermediate and final results of topology optimization. Physics constraints (e.g. volume fraction constraint) can be imposed to train the generative ML model. The generative ML model can be trained based on machine learning to conceive designs not possible by traditional solvers.

In another embodiment, a generative model can be trained (or learn) to generate (or assign) a score or weight for an input design (e.g. an automatically produced generative design). As a result, a large number of design alternates can be scored and ranked, for example, to provide top N (e.g., N=20) choices of these design alternatives.

In one embodiment, a method can include the following operations: training a generative model to generate a plurality of optimal topologies for a set of parameters defining a set of possible physical structures; and storing the trained generative model for use in generating a plurality of optimized topologies of a structure, each of the optimized topologies being different than other optimized topologies in the plurality of optimized topologies. In one embodiment, a topology defines a shape of the structure and varying densities of one or more materials in the structure, and a topology can be optimized by distributing the one or more materials inside a design region of the structure to have optimal properties and satisfy prescribed loads, design and manufacturing constraints. In one embodiment, the generative model comprises a generative adversarial network (GAN) that includes at least one encoder neural network and at least one decoder neural network and a discriminator network. In one embodiment, the method can further include the operations of: training a first encoder; and training a second encoder, wherein the first encoder encodes strain values and the second encoder encodes density values. Prior to training of the generative model, the method can further include the operation of: generating, by a solver, training data for use in training the generative model, the training data comprising extracted intermediate results for strain values and density values from a plurality of topology optimizations by the solver, the solver performing the plurality of topology optimizations for (1) a plurality of geometric shapes and (2) a plurality of loads, and (3) a plurality of model stiffnesses, and (4) a plurality of boundary conditions, and (5) a plurality of volume fraction reduction constraints. In one embodiment, the training is based on an input target density value and an initial topology optimization by the solver that performs a minimization of elastic strain energy throughout the structure.

In one embodiment, the method can further include the following operations: generating, by the trained generative model, the plurality of optimized topologies of the structure; scoring each of the optimized topologies in the plurality of optimized topologies, the scoring based on one or more of: (1) a measure of dissimilarity in generated density relative to a density of an initial optimized topology or (2) a measure of smoothness; and ranking the optimized topologies based on the scoring. In one embodiment, the method can further include the operation of: transforming, by the trained generative model, a first resolution output from the solver to a second resolution which is higher than the first resolution. In one embodiment, the generating, by the trained generative model, of the plurality of optimized topologies is performed by one or more graphics processing units in the data processing system.

In one embodiment, after the selection of an optimized topology from the method, the structure can be fabricated by an additive manufacturing process (e.g., 3D printing using layers of added material); in this case, the method can further include the operation of: generating output data, based on a selected one of the optimized topologies, the output data in a format for use in additive manufacturing of the structure.

The aspects and embodiments described herein can include non-transitory machine readable media that can store executable computer program instructions that when executed cause one or more data processing systems to perform the methods described herein when the computer program instructions are executed. The instructions can be stored in non-transitory machine readable media such as in dynamic random access memory (DRAM) which is volatile memory or in nonvolatile memory, such as flash memory or other forms of memory. The aspects and embodiments described herein can also be in the form of data processing systems that are built or programmed to perform these methods. For example, a data processing system can be built with hardware logic to perform these methods or can be programmed with a computer program to perform these methods.

The above summary does not include an exhaustive list of all embodiments are aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
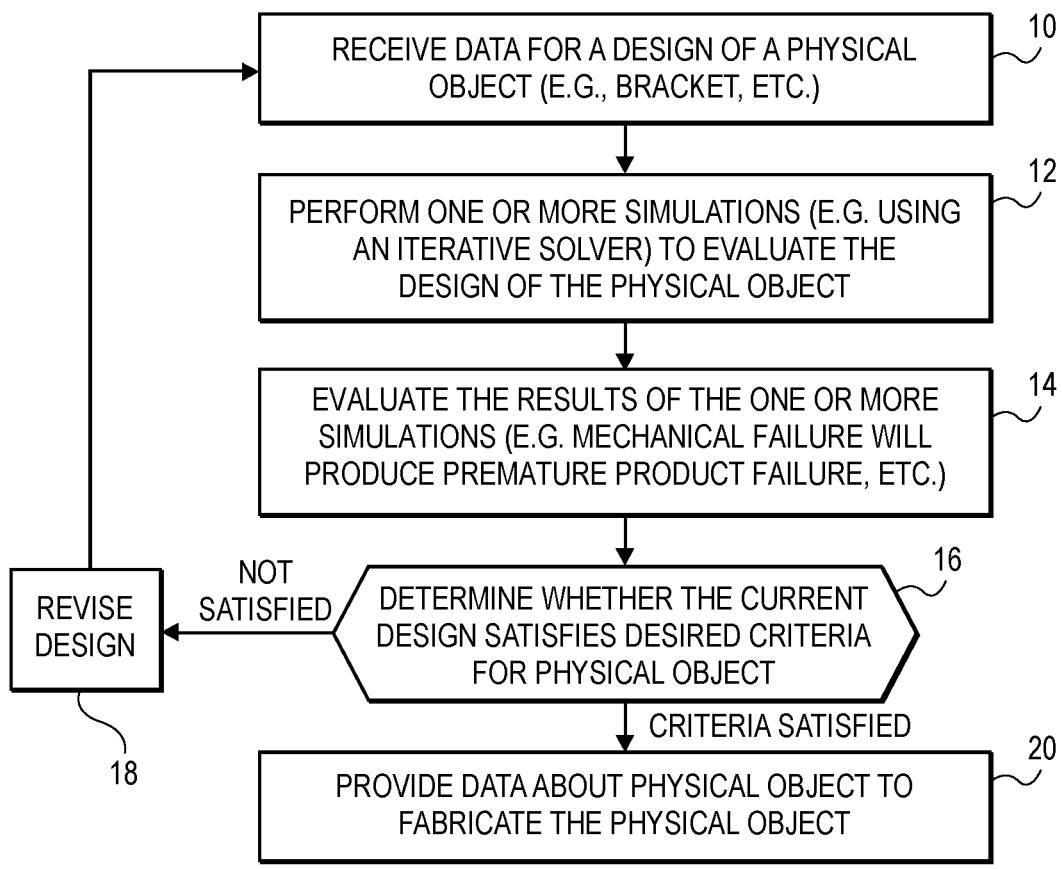
FIG. 1 is a flowchart which illustrates a method which can be used according to one or more embodiments described herein to design and fabricate a physical object.

The embodiments described herein can be used to provide optimized topology solutions for models of a physical system or physical structure. These models can be used in simulations of physical objects and physical systems in order to determine whether a particular design of the physical structure or physical system satisfies particular requirements for the structure or system. For example, there might be certain design requirements for how an airplane wing should operate while the airplane is flying through a fluid such as air. Similarly, there may be certain design requirements for a bracket which will support a load; those design requirements can include loads and volume reduction constraints. FIG. 1 shows a method in which these design requirements can be tested relative to a particular design of a physical structure or physical system which is being simulated. In operation 10 of FIG. 1, a data processing system can receive data about a design for a particular physical object. The data can be created in CAD software on a data processing system, and the data can include information about the materials used to fabricate the physical object as well as sizes of different parts of the physical object, the shape of the physical object, etc. Then in operation 12, the data processing system can perform one or more simulations to evaluate the design of the physical object; these simulations can include one or more topology optimizations to attempt to reduce the amount of material used to make the physical object. In one embodiment, the data processing system can perform simulations by using an iterative solver which converges upon a solution. In operation 14, the designer can evaluate the results of one or more simulations to determine whether the design of the physical object satisfies certain desired criteria for the physical object. For example, the designer can determine whether the expected failure rate or product lifecycle indicated in the simulation's results satisfy desired criteria for the physical object. This determination is shown in operation 16. If the criteria is satisfied, then the designer in operation 20 can provide data about the physical object to allow the fabrication or manufacture of the physical object. For example, if the criteria is satisfied, a CAD file can be produced that describes how to build the physical object such as an airplane wing. If the criteria are not satisfied as determined in operation 16, the designer can revise the design in operation 18 (for example, by changing sizes or shapes of parts in the physical object or changing the composition of material(s) in the object, etc.) and repeat the process by performing additional further simulations to evaluate the redesigned physical object. This can be repeated until the desired criteria are achieved for the physical object, and may require the designer change the design in terms of the materials used and other parameters that describe how the physical object will be fabricated or otherwise produced. In one embodiment, the data from operation 20 can include output data that is in a format suitable for use in additive manufacturing (such as additive layer manufacturing or 3D printing) of the object or structure.

Figure 2A:
FIG. 2A shows an example of a physical structure such as a bracket.
Figure 2B:
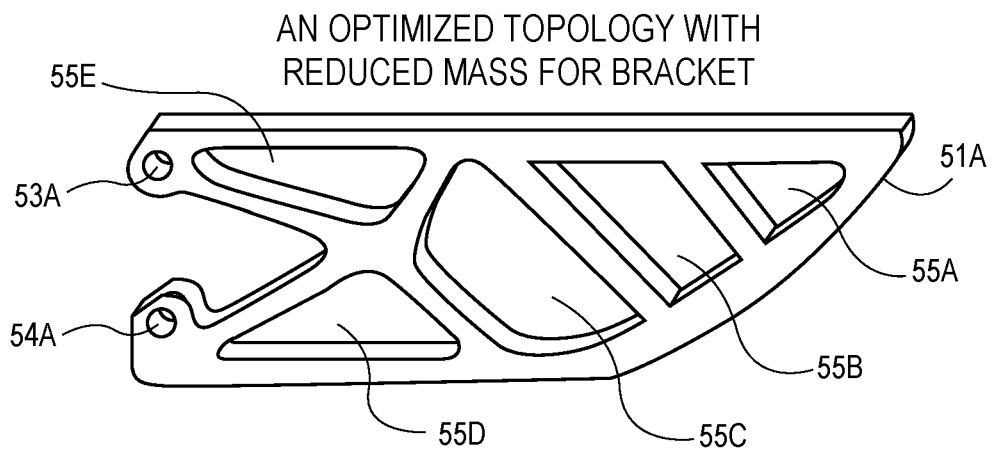
FIG. 2B shows an example of the physical structure in FIG. 2A after a topology optimization has provided an optimized topology in which most of the material has been removed, leaving a web like structure.

FIGS. 2A and 2B show the before and after result of a topology optimization of a physical structure such as a bracket that will be used to support a load. Topology optimization is a numerical technique to distribute the material inside a design region of the structure to have optimal properties (e.g., mechanical strength properties, etc.) and satisfy prescribed loads, design and manufacturing constraints. For example, this distribution can include removing the material from some regions of the structure, and this distribution can also include adding material to other regions of the structure. This distribution changes the spatial density of the material. Traditionally, topology optimization uses computer implemented solvers to perform a minimization of elastic strain energy (referred to as SIMP) of a part for a given total weight and boundary conditions that were specified as inputs to the solver. As shown in FIG. 2A, the initial design of the bracket 51 is a solid block of material with two holes 53 and 54; this solid block of material will use more material than the optimized bracket 51A and will weigh more than the optimized bracket 51A. The designer may desire to reduce the usage of material (e.g., to reduce cost and weight) while retaining mechanical strength at a sufficient level to support the expected loads. For example, the designer may want to test out different topology optimizations that reduce the volume/mass by different amounts (e.g., a 30% reduction in volume, a 40% reduction in volume, and a 50% reduction in volume). FIG. 2B shows an example of an optimized topology that has significantly reduced the volume/mass of the bracket 51 to achieve the bracket 51A. In the example shown in FIG. 2B, the reduction may be as high as 80% (so if the bracket 51 weighs 100 grams, the bracket 51A weighs 20 grams); the reduction can also be specified in volume (e.g., cubic centimeters) of the structure. The bracket 51A retains the two holes (shown as holes 53A & 54A) and also includes voids in which the material was removed in order to reduce the weight or volume of the bracket. The optimized bracket 51A can be one of the optimized topologies provided as an output (or scored output) from the trained generative model described herein, such as the generative model 251A shown in FIGS. 6C and 7B. This output can include, for example, a plurality of different optimized topologies at each of the target reductions in volume (such as 5 optimized topologies at the 30% target reduction, 5 optimized topologies at the 40% target reduction, and 5 optimized topologies at the 50% target reduction).

Figure 3:
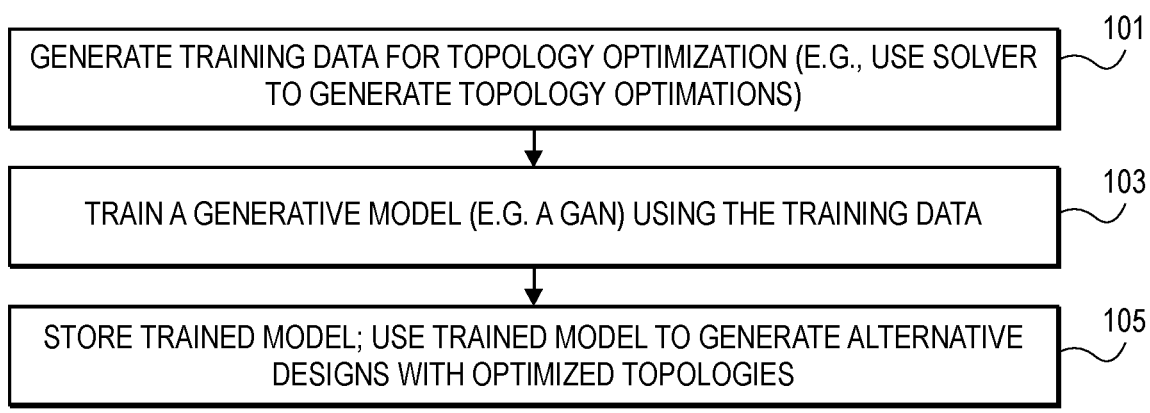
FIG. 3 is a flowchart that shows an example of a method according to an embodiment described herein.
Figure 4:
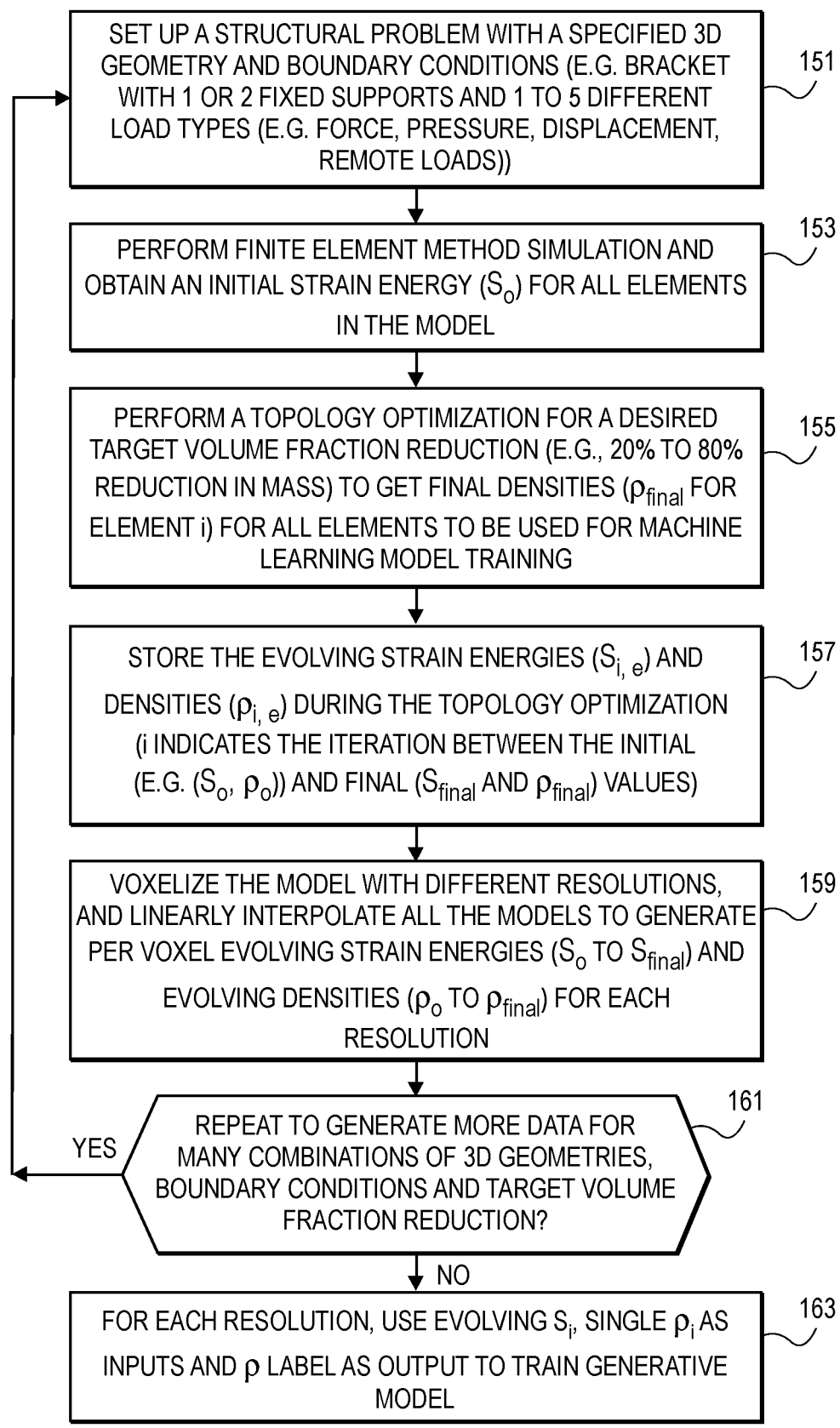
FIG. 4 is a flowchart that shows an example of a method for generating training data according to an embodiment described herein.

Prior to using the generative model, the generative model is trained, and FIGS. 3, 4, 5A, 5B, 6A, and 6B show examples of how the generative model can be trained according to one or more embodiments. FIG. 3 shows an example of a general method to train a generative model. This method can include operations 101, 103, and 105 as shown in FIG. 3. In operation 101, a data processing system, with inputs from a user, can generate training data for topology optimization. This training data can be generated through the use of a topology optimization solver to generate a set of optimized and intermediate topologies. FIG. 4 shows a detailed example of one embodiment of a method for generating training data; FIG. 4 will be described further below. In operation 103, the data processing system can train a generative model using the training data that was generated in operation 101. Once the generative model has been trained, it can be stored in nonvolatile memory in operation 105 and used later to generate alternative designs with optimized topologies.

A specific method for generating training data will now be described while referring to FIG. 4. In operation 151, a designer of a physical structure can set up a structural problem with a specified three dimensional (3D) geometry and boundary conditions. For example, the designer can set up a structural problem for a bracket (such as the bracket 51 in FIG. 2A) with one or two fixed supports and 1 to 5 different load types including, for example, force, pressure, displacement, remote loads, etc. Then in operation 153, using the structural problem which has been set up in operation 151, a data processing system can perform a set of one or more finite element method simulations to obtain an initial strain energy ($S_0$) for all elements in the model. The set of finite element method simulations can use techniques known in the art to perform these types of simulations to derive initial strain energy. Then in operation 155, the data processing system can perform a topology optimization for a desired target volume fraction reduction (e.g., a 40% reduction in volume) to get final densities (e.g., $\rho$ final) for all elements to be used for machine learning model training. Operation 155 can use techniques known in the art to perform topology optimization, such as the known topology optimization algorithms referred to above. In the process of performing the topology optimization in operation 155, the optimization algorithm will produce evolving strain energies ($S_i$) and evolving densities ($\rho_i$), and these will be stored in operation 157 for use in training neural network autoencoders, such as the autoencoders shown in FIGS. 5A and 5B. In operation 159, the data processing system can voxelize the model with different resolutions and linearly interpolate all the models to generate per voxel evolving strain energies ($S_0$ to $S_{final}$) and per voxel evolving densities ($\rho_0$ to $\rho_{final}$) for each resolution. In operation 161, the data processing system determines whether or not to repeat the process to generate more training data for many different combinations of three-dimensional geometries, boundary conditions and target volume fraction reductions. Operation 161 allows the data processing system to create a large set of data for different types of geometries, load conditions, model stiffness conditions, boundary conditions and target volume fraction reductions which can then yield a rich and robust set of training data because of the use, during training of the different combinations of three-dimensional geometries, load conditions, model stiffness conditions, boundary conditions and target volume fraction reductions. If the data processing system determines that is necessary to repeat the process to generate more training data, then processing will revert back to operation 151. If sufficient data has been generated, as determined in operation 161, the data processing system can proceed to operation 163 in which the data processing system can use, for each resolution, the evolving set of strain energies and densities (as inputs) and the final density (as an output) to train a generative model as will be described further below. The method shown in FIG. 4 represents a specific example of a method to generate training data to train a generative model, but other methods may also be used to create the training data for the generative model.

Figure 5A:
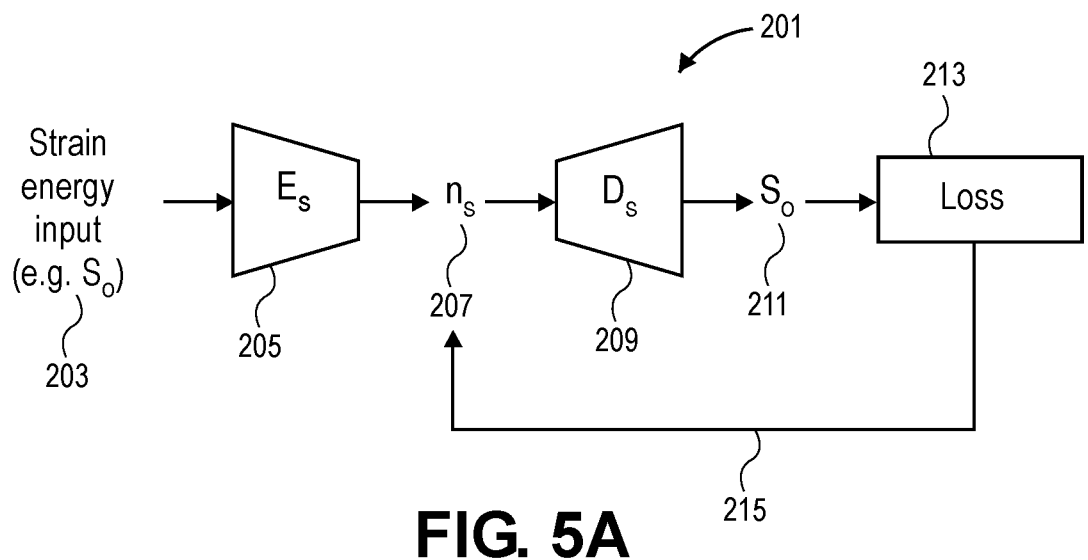
FIG. 5A shows training of a convolutional neural network autoencoder for strain energies according to an embodiment.
Figure 5B:
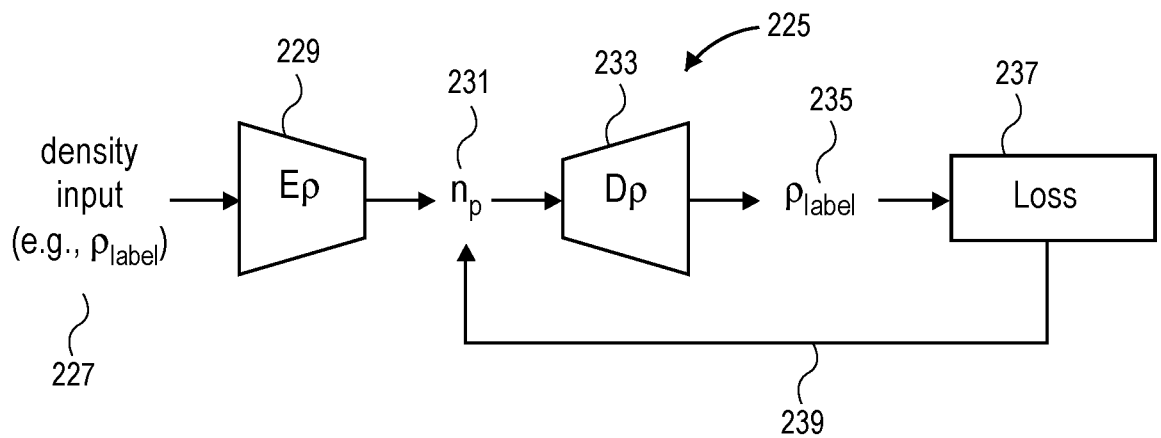
FIG. 5B shows training of a convolutional neural network autoencoder for densities (p) according to one embodiment.

FIGS. 5A and 5B show examples of how the training data from the method shown in FIG. 4 can be used to train neural networks that are configured as autoencoders, such as autoencoders implemented as convolutional neural networks (CNN). These CNN autoencoders can be trained by using the stored intermediate (e.g., evolving) values for strain energies and densities from operation 157; in other words, these evolving values for strain and density and the final strain and density values can be used to train these CNN autoencoders 201 and 225. These CNN autoencoders represent an example of a machine learning model that can be trained to create a generative model, but other types of machine learning models may alternatively be used to create a trained generative model. Once these CNN autoencoders 201 and 225 are trained, they can be used to train the generative model, such as generative model 251 (which can be a neural network) shown in FIG. 6A and the discriminative network 253 (which can be a neural network) shown in FIG. 6A.

The autoencoder 201 shown in FIG. 5A includes an encoder neural network 205 and a decoder neural network 209. Encoder network 205 receives strain energy input values 203 and encodes these values into lower-dimensional latent vectors 207 ($\eta_s$) for the strain values. The latent vectors 207 are inputs to the decoder neural network 209 which outputs strain values 211 (S) to a loss function 213. The loss between the input and predicted strain values (as determined by the loss function 213) provides updated correction factors 215 to adjust coefficients within each of the neural networks in the autoencoder 201 to train the autoencoder 201; in particular, the loss function 213 can provide correction values to the encoder neural network 205 and the decoder neural network 209 to train both neural networks in the autoencoder 201. The strain energy input values 203 can be the set of evolving strain values stored in operation 157 and final strain value ($S_{final}$) can be a value used by loss function 213 to train the autoencoder 201.

The autoencoder 225 shown in FIG. 5B includes an encoder neural network 229 and a decoder neural network 233. Encoder network 229 receives density input values 227 and encodes these values into latent vectors 231 ($\eta_\rho$) for the density values. The latent vectors 231 are inputs to the decoder neural network 233 which outputs density values 235 ($\rho$) to a loss function 237. The loss between the input and predicted density values (as determined by the loss function 237) provides updated correction factors 239 to adjust coefficients within each of the neural networks in the autoencoder 225 to train the autoencoder 225. In particular, loss function 237 can provide correction values to the encoder neural network 229 and the decoder neural network 233 to train both neural networks in the autoencoder 225. The density input values 227 can be the set of evolving density values stored in operation 157 and the final density value can be the value used by the discriminator to train the autoencoder 225.

Figure 6A:
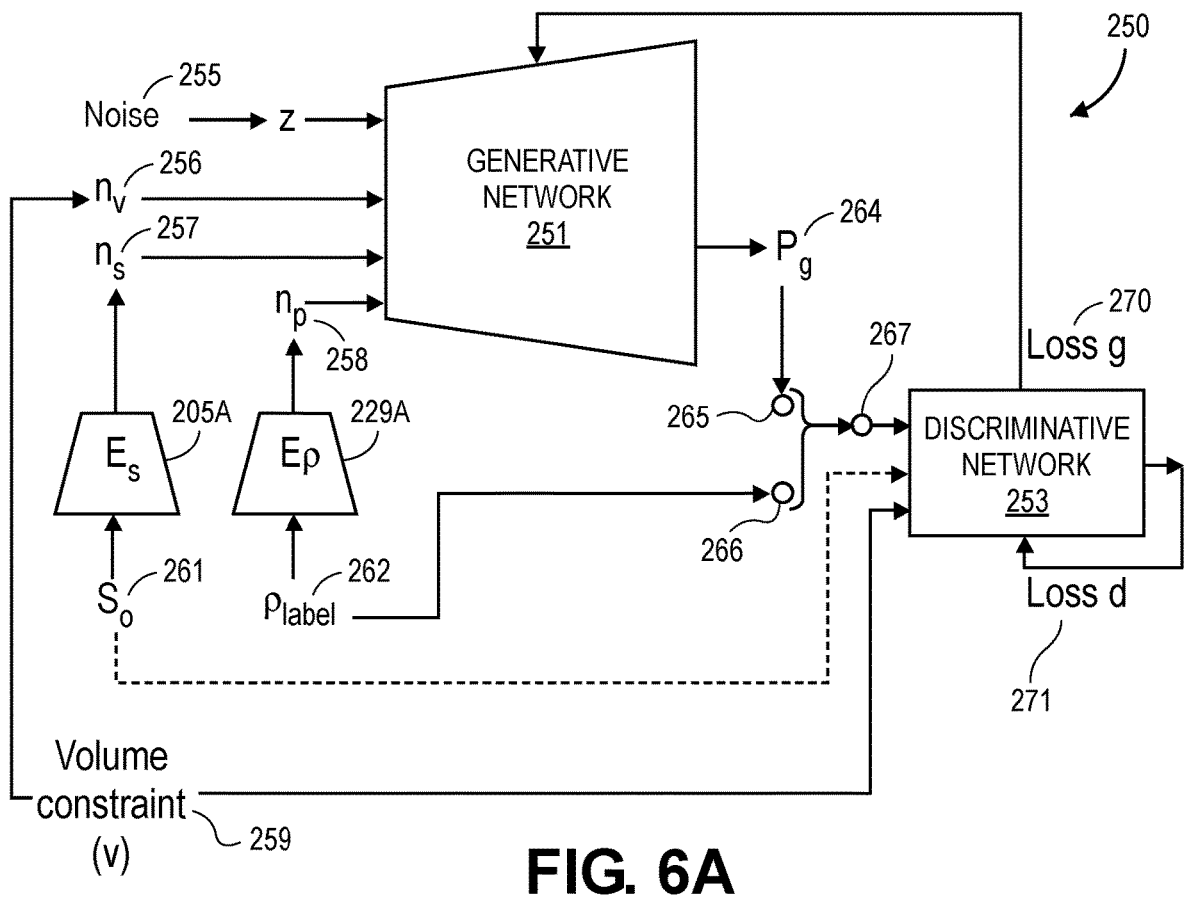
FIG. 6A shows training of a generative network and a discriminative network.
Figure 6B:
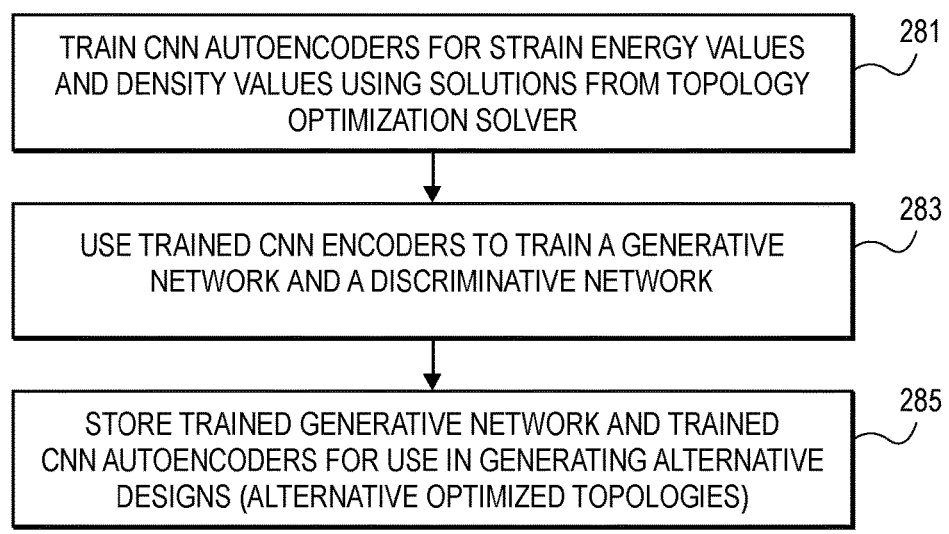
FIG. 6B is a flowchart that shows a method according to one embodiment described herein.

Referring now to FIG. 6B, the training of autoencoders 201 and 255 is shown as operation 281 in FIG. 6B. After these autoencoders are trained in operation 281, the encoders 205 and 229 become trained encoders (such as trained encoders 205A and 229A shown in FIGS. 6A and 6C). These trained encoders can then be used in operation 283 to train a generative network, such as generative network 251 in FIG. 6A, and a discriminative network, such as discriminative network 253 in FIG. 6A. After the generative network has been trained, in operation 285 the trained generative network and the trained CNN autoencoders can be stored for use in generating a plurality of alternative designs in the form of alternative optimized topologies.

FIG. 6A shows an example of a system 250 for training the generative model (in the form of a generative neural network 251) and a discriminative network 253. This system 250 can use the trained encoders 205A and 229A to provide inputs 257 (latent strain values $\eta_s$) and 258 (latent density values $\eta_\rho$) to the generative network 251 during training of the generative network 251. The inputs 257 and 258 are from the outputs of the trained encoders 205A and 229A, and the outputs of these trained encoders are based respectively on the strain energy inputs 261 and density inputs 262 that are inputted to the trained encoders 205A and 229A. The generative network 251 also receives a noise input (z) 255 that can be a random value selected from a probability distribution (such as a normal probability distribution function). The generative network also receives an encoded value 256 ($\eta_v$) that represents a selected volume reduction constraint (such as, for example, a desire volume reduction of 30%). Over several training epochs, the input values are applied to the generative network 251, and the current output value 264 (a density value $\rho_g$) is generated by the generative network 251 based on the current input value. As is known in the art, multiple training epochs are used, and in each epoch an input value is applied to the generative network and the output value 264 is provided by the generative network and this output value is then applied (through node 265 and node 267) as an input to the discriminative network 253 so that the discriminative network 253 can generate a current loss function (Loss g) value to train the generative network using training techniques known in the art. This loss function value 270 is then applied to train/adjust the coefficients in the generative network 251. This process repeats for each training epoch. In the system shown in FIG. 6A, the discriminative network 253 is also trained by providing density inputs 262 through node 266 and node 267 (when node 265) is not used as an input to discriminative network 253. The loss function 271 generated by the discriminative network 253 is used to adjust/train the discriminative network 253 when it is being trained. The system 250 can toggle between training of the generative network 251 and training of the discriminative network 253 by toggling between use of nodes 265 and 266. The discriminative network 253 can use the volume reduction constraint value 259 as an input and can also use the strain values as inputs in one embodiment (shown by the dashed line). After a sufficient amount of training (which can be determined when the loss values become smaller than a desired error level), the generative network 251 becomes the trained generative network 251A, and the trained generative network 251A can be used in the embodiments shown in FIGS. 6C and 7B to generate a plurality of optimized topologies. In one embodiment, the trained generative network 251A can generate many different optimized topologies over a large variety of different 3D geometries, model stiffnesses, boundary conditions, volume reduction constraints, load conditions and other different parameters. This can allow designers to explore a wide variety of different optimized topologies for a particular structure.

Figure 6C:
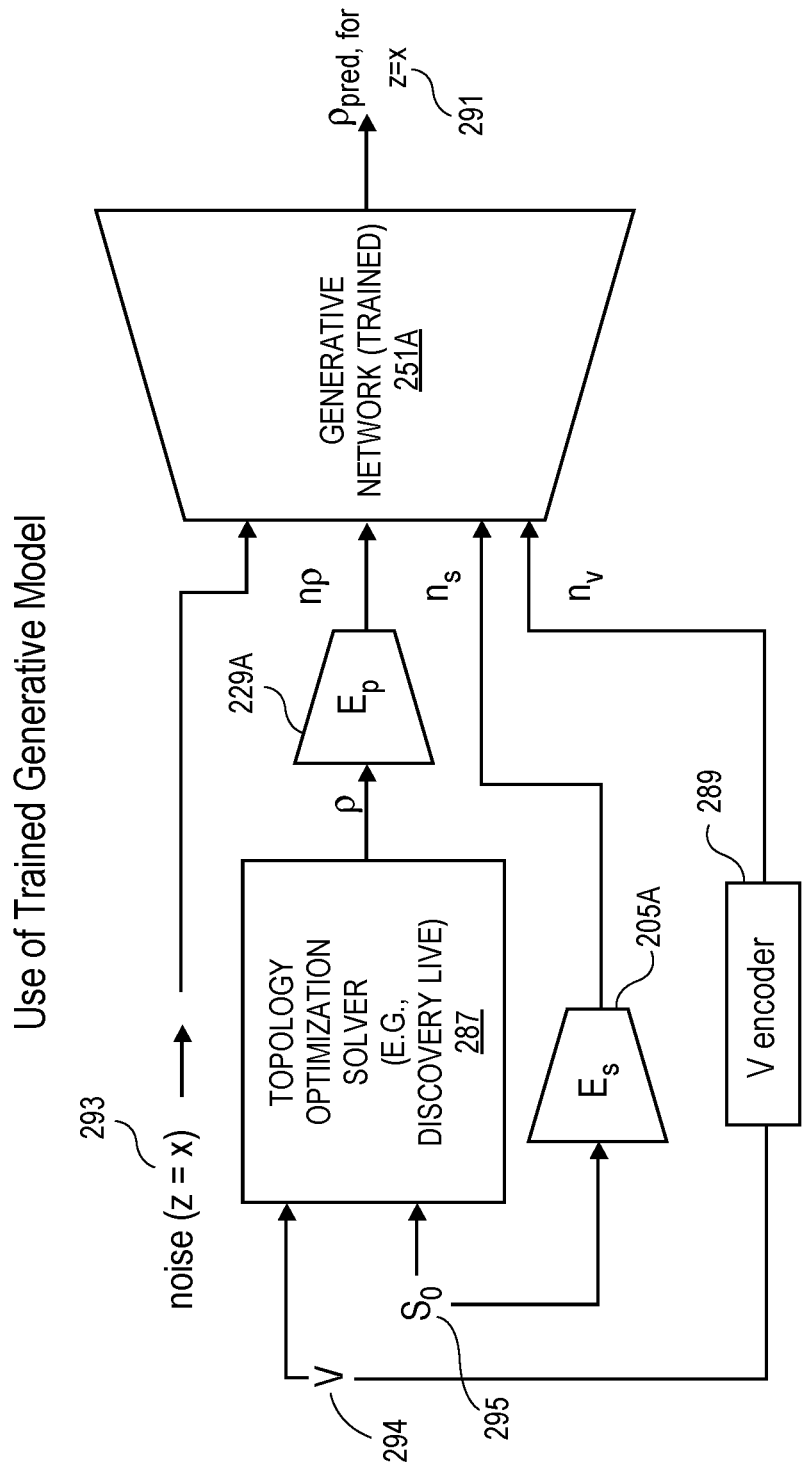
FIG. 6C shows an example of a use of a trained generative model according to one embodiment.

After a generative network has been trained using one of the embodiments described herein, the generative network can be used in a system to create a plurality of optimized topologies quickly and efficiently. FIG. 6C shows such a system that includes a trained generative network 251A, the trained encoder 205A, and the trained encoder 229A. The system in FIG. 6C also includes topology optimization solver 287, such as a topology optimization solver in the Ansys Discovery Live simulation software available from Ansys, Inc. of Canonsburg, Pennsylvania. A designer can select a desired volume reduction 294 ($v$), such as a 30% volume reduction, and can obtain an initial strain energy 295 ($S_0$) at each voxel in the design. Using the desired volume reduction 294 and the initial strain energy 295 as inputs to the topology optimization solver 287, the solver 287 can provide a density output ($\rho$) which is a set of density values, that includes a density value at each voxel (thereby providing a density distribution across the voxels in the design). This density output is then applied as an input to the trained encoder 229A to generate a latent vector output ($\eta_\rho$) that represents the density output $\rho$ in a latent vector space of density values. The trained encoder 205A receives the initial strain energy 295 as an input and generates a latent vector output ($\eta_s$) that represents the strain energy in a latent vector space of strain energy values. The desired volume reduction 294 ($v$) is encoded by encoder 289 into a latent vector output n v that represents the desired volume reduction in a latent vector space of desired volume reductions. These latent vector output values ($\eta_p$, $\eta_s$, and $\eta$ v) are then applied as inputs to the trained generative network 251A which also receives a random z vector 293 ("noise"); this random z vector can be used to generate a family of densities (e.g., a family of optimized topologies) by picking a random z vector as many times as one wants to generate new densities. The trained generative network 251A generates a new set of density values (e.g., $\rho$ pred, for z=x) as an output 291 for each new z value. Each set of density values represents an optimized topology containing a distribution of density values across the voxels in the simulated structure. Thus, by varying z, the trained generative network can produce a large variety of optimized topologies at the output 291. In one embodiment, the trained generative network can generate high resolution densities (e.g., higher density of voxels) based on lower density inputs from the solver.

Figure 7A:
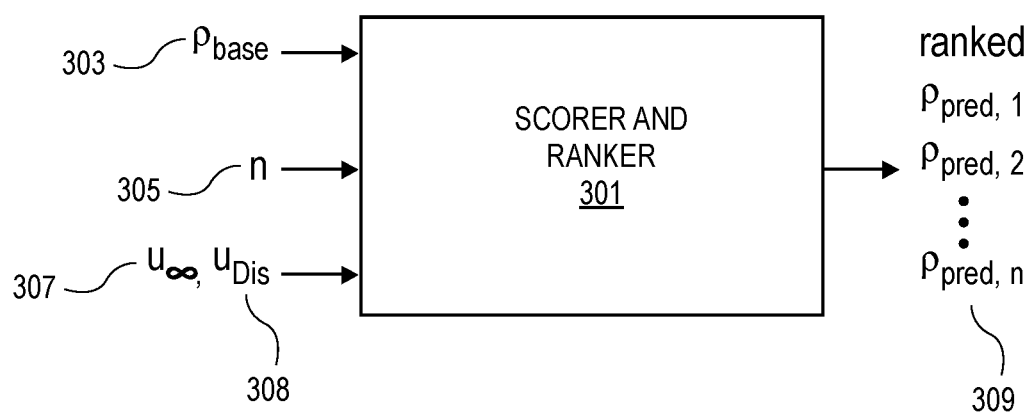
FIG. 7A shows an example of a scorer and ranker according to one embodiment.

In one embodiment, the trained generative network 251A can be used to generate a set of optimized topologies, represented by a set of densities at voxels in the simulated structure, and then a system can score and rank these optimized topologies. FIG. 7A shows a simplified example of a scorer and ranker 301 that can include the trained generative network 251A. In one embodiment, the scorer and ranker 301 can receive several user inputs (such as user design goals) and an initial density value 303 (p base), such as an initial output of the topology optimization from a solver (e.g., solver 287) that represents an initial optimized topology (having a density distribution that includes a density value at each voxel in the structure). The scorer and ranker 301 can inference on the generative model (e. g., generative network 251A) to generate, score and rank various possible density distributions generated by the generative model (such as $\rho$ pred) based on the given initial density distribution value 303 (such as $\rho$ base) and the user design goals. In one embodiment, the user design goals can include a desired number n 305 of generated density distribution values, a dissimilarity value 308 ($u_{DIS}$) that sets a level of creativity based on the dissimilarity value, and a smoothness value 307 ($u_\infty$) that specifies a smoothness (as opposed to roughness) desired by the user or designer of the structure. The desired number n 305 determines the number of sets of density values generated, scored and ranked; for example, if n=10 then the scorer and ranker 301 generates, scores and ranks 10 sets of density values. Each set of density values is a set of density values at the voxels in the simulated structure and is in effect a predicted optimized apology generated by the generative model; in other words, a set of density values is a density distribution over the voxels, with each voxel having a generated density value. The highest ranked density value can be referred to as $\rho$ pred, 1 and the lowest ranked density value can be referred to as $\rho$ pred, n. The dissimilarity value 308 can be, for example, a fraction between 0.0 and 1.0 with 1.0 representing the highest creativity and 0.0 representing the least creativity; the least creative designs are those designs that are most similar to the base design represented by the density value 303 ($\rho_{base}$), and the most creative designs are those that are most similar to the base design. The fraction of dissimilarity may be computed using different metrics such as the inverse of Euclidean distance between the generated designs and the base design, normalized by the same metric of the best design. The smoothness value 309 can be, for example, a fraction between 0.0 and 1.0, with 1.0 representing the smoothest design (as measured by a mathematical differentiation) and 0.0 representing the least smooth (or roughest) design. The smoothness of all the generated designs may be computed by measuring the gradients and Laplacians of the density distribution. The score and ranker 301, using the user design goals and the initial density value 303, can generate, score and rank an output 309 of n sets of density distributions ($\rho$ pred 1, $\rho$ pred 2, . . . $\rho$ pred n). The net score assigned to each design is calculated as a weighted sum of creativity and smoothness. Finally, generated designs with a weighted sum that is close to the weighted sum of the user design goals are ranked higher. The closeness between the weighted sums of the generated designs and the user design goals may be calculated using metrics, such as the inverse Euclidean distance A designer of the structure can then review the ranked list of n sets and review each predicted optimized topology represented by each set in the n sets and select one or more sets for further evaluation, analysis and simulation of the design of the structure.

Figure 7B:
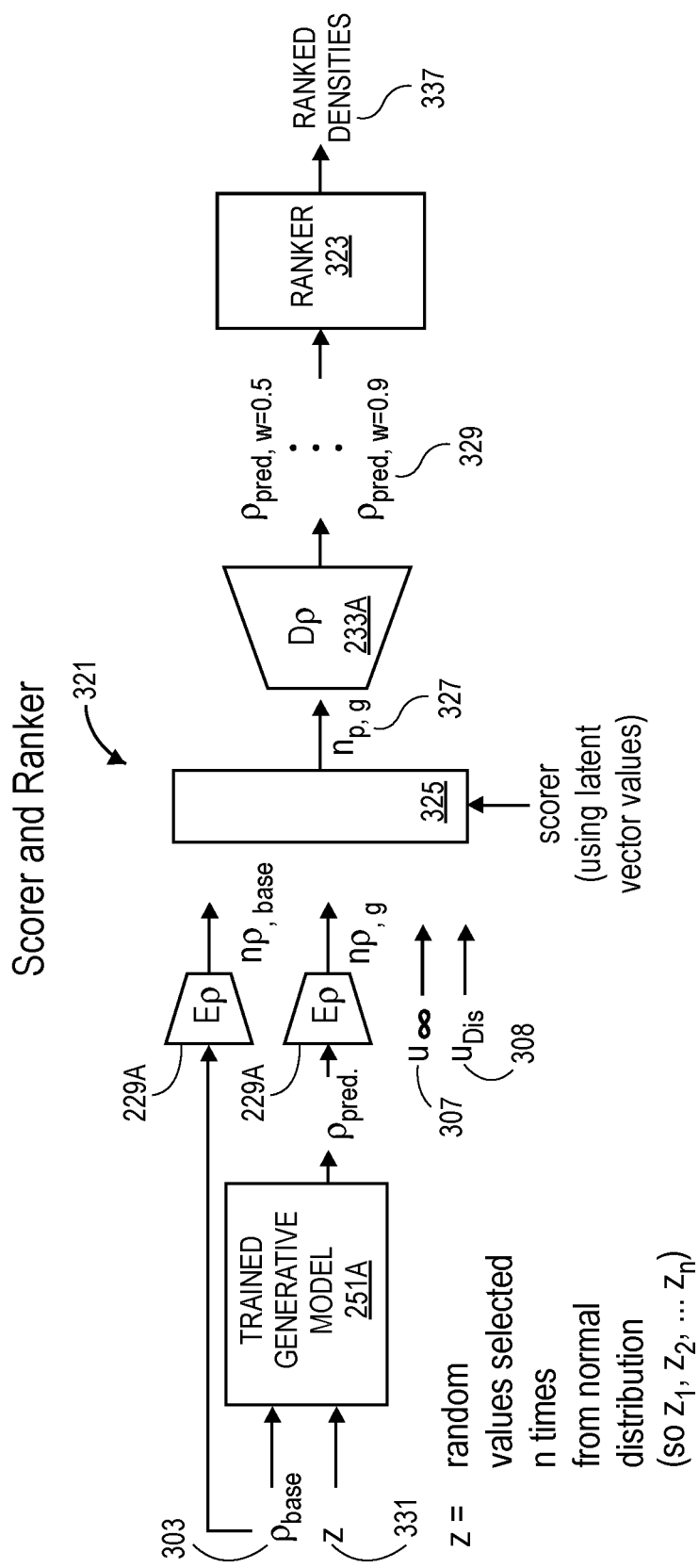
FIG. 7B shows a more detailed example of a scorer and ranker according to one embodiment.

A more specific example of a system that can generate, score and rank predicted optimized topologies is shown in FIG. 7B as system 321. The system 321 includes the trained generative model 251A, two instances of trained encoder 229A, a scorer 325, the trained decoder 233A, and a ranker 323. The trained generative model 251A receives the density value 303 input and also receives a series of random values z 331 based upon the number n 305 (shown in FIG. 7A). For example, if n=10, then 10 random z values are generated (for example, by randomly selecting a value between 0.0 and 1.0 from a normal, Gaussian probability distribution). The initial density value 303 can be obtained from a solver (for example the topology optimization solver 287 in FIG. 6C) and applied as an input to the trained generative model 251A and applied as an input to the trained encoder 229A (shown as the top instance of the encoder in FIG. 7B) to generate the latent vector $\eta_{p,\ base}$. The trained generative model 251A generates, for each inputted random z value (for example, $z_2$), a predicted apology optimization (ρ pred) of density values distributed across voxels of the structure, and this predicted topology optimization is then applied as an input to the trained encoder 229A (shown as the lower instance in FIG. 7B) to generate the latent vector $\eta_{p,g}$ (latent vector of generated predicted optimized topology). These latent vectors ($\eta_{p,\ base}$ and $\eta_{p,g}$) and the user design goals (e.g., $u_\infty$ 307 and $u_{DIS}$ 308) are then applied as inputs to the scorer 325. The scorer 325 can then score each predicted topology optimization (relative to the base apology optimization) in the latent vector values (inputted to the scorer) and provide an output 327 to the trained decoder 233A which in turn provides a ranked set of predicted apology optimizations 329 to a ranker 323. The ranker 323 can then rank the predicted topology optimizations into a list of ranked densities 337. The ranked density 337, like the output 309 of n sets of density distributions in FIG. 7A, can be used by a designer to perform further evaluation, analysis and simulation of the design.

Figure 8:
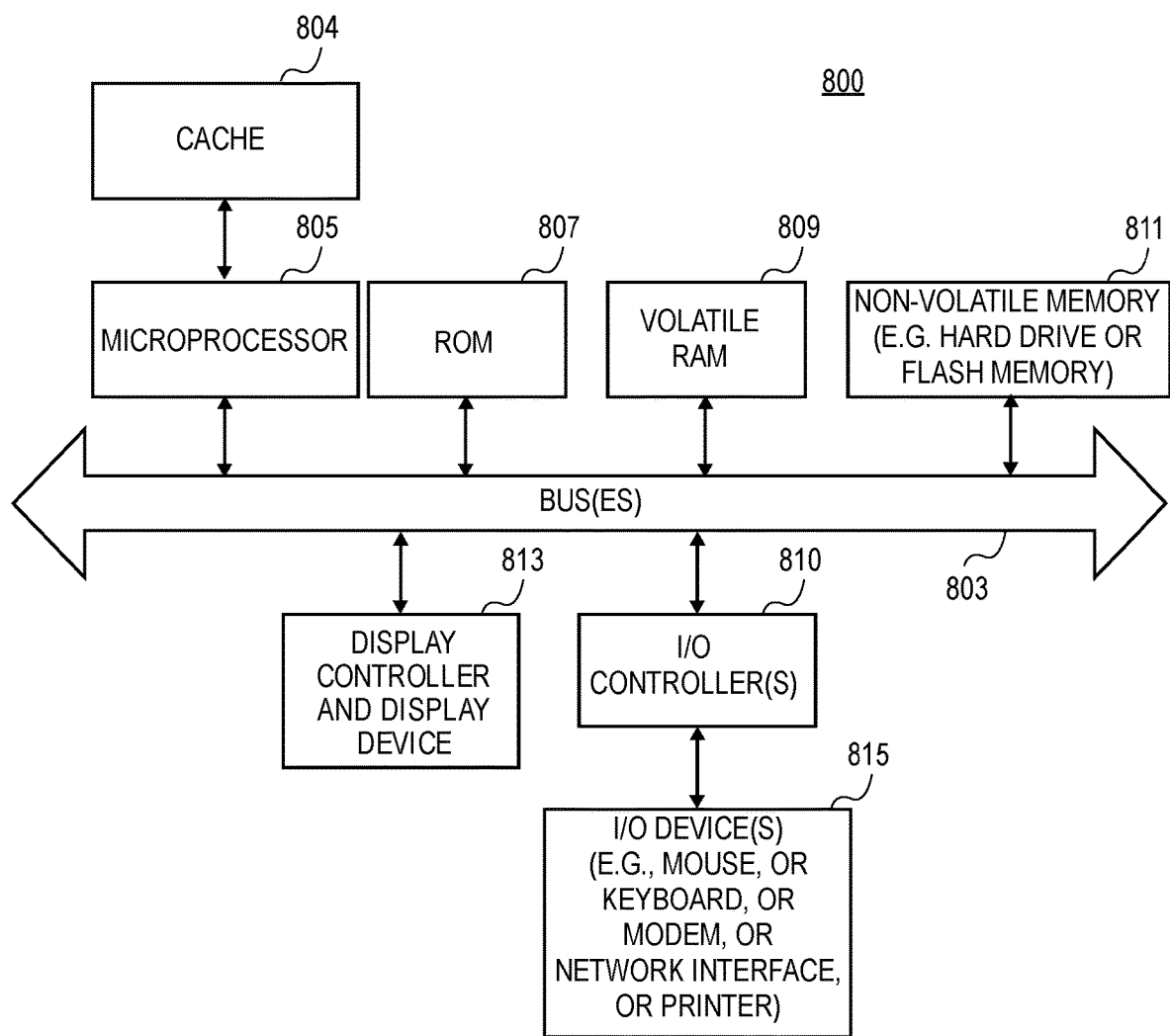
FIG. 8 shows an example of a data processing system that can be used to implement one or more embodiments described herein.

FIG. 8 shows one example of a data processing system 800, which may be used with one or more embodiments described herein. For example, the system 800 may be implemented to provide a system or device that performs any one of the methods described herein, such as the method of FIG. 1, 3, 4, or 6B. The system 800 may also be used to implement any one of the systems described herein such as the training system shown in FIG. 5A, 5B or 6A and may be also used to implement the systems shown in FIGS. 6C, 7A and 7B. Note that while FIG. 8 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 8, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 8 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a non-transitory computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a non-transitory machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more non-transitory memories (e.g., one or more flash memories, random access memories (static, dynamic or other)), optical disks, CD-ROMs, DVD ROMs, EPROMS, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)) and then stored in non-transitory memory (e.g., DRAM or flash memory or both) in the client computer.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable computer program instructions which when executed by a data processing system cause the data processing system to perform a method, the method comprising:

receiving a design of a physical structure, the design including a volume constraint and initial mechanical properties for the physical structure;

receiving a plurality of inputs including a desired number of one or more alternative material distributions to be generated and a desired criteria for material distribution identification;

performing a topology optimization, via a topology optimization solver, for the design based on the initial mechanical properties and the volume constraint to obtain a first material distribution for the physical structure;

training encoders to encode the first material distribution and the initial mechanical properties into latent vectors to have a lower dimension than values associated with the first material distribution and the initial mechanical properties;

encoding, via the trained encoders, the first material distribution and the initial mechanical properties into the latent vectors in a latent space of a trained generative network;

obtaining a plurality of random numbers according to the desired number of the one or more alternative material distributions to be generated;

generating, via the trained generative network, the one or more alternative material distributions from the latent vectors, the volume constraint and the plurality of random numbers, the one or more alternative material distributions being generated as alternative topology designs according to the plurality of random numbers through the trained generative network without requiring additional topology optimizations of the topology optimization solver, the trained generative network having been trained to generate, for each of the plurality of random numbers, one of the one or more alternative material distributions representing density values across voxels in a simulated region of the physical structure; and identifying one of the one or more alternative material distributions according to the desired criteria for manufacturing of the physical structure.

2. The non-transitory machine readable medium as in claim 1, wherein the first material distribution comprises an initial density distribution of one or more materials in the physical structure, and wherein the initial mechanical properties comprise an initial distribution of strain energy in the physical structure.

3. The non-transitory machine readable medium as in claim 1, wherein the volume constraint comprises a volume fraction reduction of one or more materials in the physical structure.

4. The non-transitory machine readable medium as in claim 1, wherein the method further comprises:

generating, by a solver, training data for use in training the generative network, the training data comprising extracted intermediate results for strain values and density values from a plurality of topology optimizations by the solver, the solver performing the plurality of topology optimizations for (1) a plurality of geometric shapes and (2) a plurality of loads, and (3) a plurality of model stiffnesses, and (4) a plurality of boundary conditions, and (5) a plurality of volume fraction reduction constraints.

5. The non-transitory machine readable medium as in claim 4, wherein the method further comprises:

encoding the extracted intermediate results for strain values and density values into latent strain values and latent density values; and training the generative network based on the latent strain values and the latent density values associated with the plurality of topology optimizations, and the plurality of volume fraction reduction constraints.

6. The non-transitory machine readable medium as in claim 1, wherein the method further comprises:
scoring each of the one or more alternative material distributions, the scoring based on one or more of: (1) a measure of dissimilarity in a density distribution of one or more materials in the physical structure represented by each of the material distributions relative to a base density distribution or (2) a measure of smoothness of the density distribution of the materials in the physical structure; and
ranking the one or more alternative material distributions based on the scoring.

7. The non-transitory machine readable medium as in claim 1, wherein
a resolution of a density of distribution of one or more materials represented by the one or more alternative material distributions is higher than a resolution of a distribution of the materials represented by the first material distribution.

8. The non-transitory machine readable medium as in claim 1, wherein the plurality of random numbers have a probability distribution and wherein, for each of the plurality of random numbers, the trained generative network predicts one of the one or more alternative material distributions from the latent vectors and the volume constraint.

9. The non-transitory machine readable medium as in claim 1, wherein the method further comprises:
generating output data based on the one material distribution identified according to the criteria, wherein the output data is in a format for use in additive manufacturing of the physical structure.

10. A machine implemented method, the method comprising:
receiving a design of a physical structure, the design including a volume constraint and initial mechanical properties for the physical structure;
receiving a plurality of inputs including a desired number of one or more alternative material distributions to be generated and a desired criteria for material distribution identification;
performing a topology optimization, via a topology optimization solver, for the design based on the initial mechanical properties and the volume constraint to obtain a first material distribution for the physical structure;
training encoders to encode the first material distribution and the initial mechanical properties into latent vectors to have a lower dimension than values associated with the first material distribution and the initial mechanical properties;
encoding, via the trained encoders, the first material distribution and the initial mechanical properties into the latent vectors in a latent space of a trained generative network;
obtaining a plurality of random numbers corresponding to the desired number of the one or more alternative material distributions to be generated;
generating, via the trained generative network, the one or more alternative material distributions from the latent vectors, the volume constraint and the plurality of random numbers, the one or more alternative material distributions being generated as alternative topology designs according to the plurality of random numbers through the trained generative network without requiring additional topology optimizations of the topology optimization solver, the trained generative network having been trained to generate, for each of the plurality of random numbers, one of the one or more alternative material distributions representing density values across voxels in a simulated region of the physical structure; and
identifying one of the one or more alternative material distributions according to the desired criteria for manufacturing of the physical structure.

11. The method as in claim 10, wherein the first material distribution comprises an initial density distribution of one or more materials in the physical structure, and wherein the initial mechanical properties comprise an initial distribution of strain energy in the physical structure.

12. The method as in claim 10, wherein the volume constraint comprises a volume fraction reduction of one or more materials in the physical structure.

13. The method as in claim 10, wherein the method further comprises:
generating, by a solver, training data for use in training the generative network, the training data comprising extracted intermediate results for strain values and density values from a plurality of topology optimizations by the solver, the solver performing the plurality of topology optimizations for (1) a plurality of geometric shapes and (2) a plurality of loads, and (3) a plurality of model stiffnesses, and (4) a plurality of boundary conditions, and (5) a plurality of volume fraction reduction constraints.

14. The method as in claim 13, wherein the method further comprises:
encoding the extracted intermediate results for strain values and density values into latent strain values and latent density values; and
training the generative network based on the latent strain values and the latent density values associated with the plurality of topology optimizations, and the plurality of volume fraction reduction constraints.

15. The method as in claim 10, wherein the method further comprises:
scoring each of the one or more alternative material distributions, the scoring based on one or more of: (1) a measure of dissimilarity in a density distribution of one or more materials in the physical structure represented by each of the material distributions relative to a base density distribution or (2) a measure of smoothness of the density distribution of the materials in the physical structure; and
ranking the one or more alternative material distributions based on the scoring.

16. The method as in claim 10, wherein
a resolution of a density of distribution of one or more materials represented by the one or more alternative material distributions is higher than a resolution of a distribution of the materials represented by the first material distribution.

17. The method as in claim 10, wherein the plurality of random numbers have a probability distribution and wherein, for each of the plurality of random numbers, the trained generative network predicts one of the one or more alternative material distributions from the latent vectors and the volume constraint.

18. The method as in claim 10, wherein the method further comprises:
generating output data based on the one material distribution identified according to the criteria, wherein the output data is in a format for use in additive manufacturing of the physical structure.

\* \* \* \* \*